No. 804,325. PATENTED NOV. 14, 1905.
J. A. KAPLAN.
HUB HOLDING AND INDEXING DEVICE.
APPLICATION FILED JULY 10, 1905.
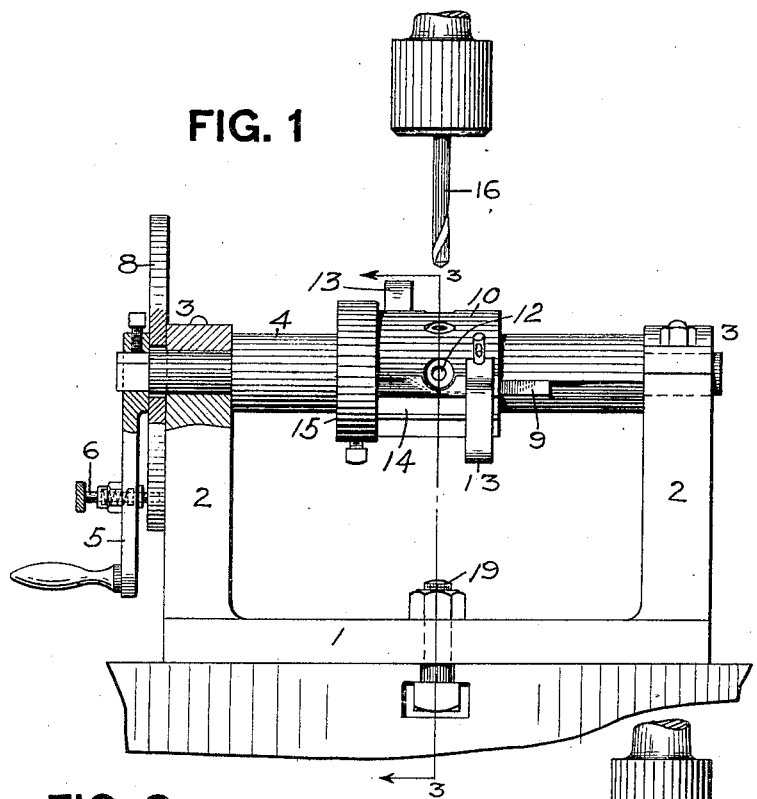
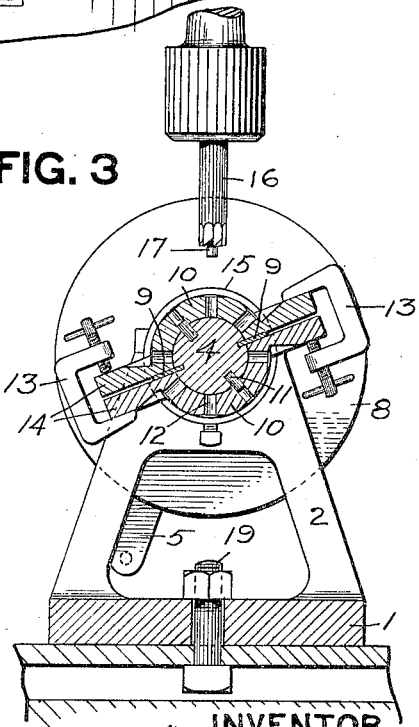
WITNESSES. INVENTOR.

UNITED STATES PATENT OFFICE.

JOSEPH A. KAPLAN, OF PITTSBURG, PENNSYLVANIA, ASSIGNOR TO JOSHUA RHODES, OF ALLEGHENY, PENNSYLVANIA, AND WILLIAM H. LATSHAW, OF PITTSBURG, PENNSYLVANIA.

HUB HOLDING AND INDEXING DEVICE.

No. 804,325.     Specification of Letters Patent.     Patented Nov. 14, 1905.

Application filed July 10, 1905. Serial No. 269,072.

*To all whom it may concern:*

Be it known that I, JOSEPH A. KAPLAN, a resident of Pittsburg, in the county of Allegheny and State of Pennsylvania, have invented a new and useful Improvement in Hub Holding and Indexing Devices; and I do hereby declare the following to be a full, clear, and exact description thereof.

This invention relates to a work holding and indexing device for use more especially with drill-presses and similar machines.

The invention is designed especially for holding and indexing sectional pulley-hubs for counterboring.

The object of the invention is to provide a simple and easily-operated device of this character whereby the work can be turned to various positions and subjected to the action of the drill or other tool at predetermined places.

In the accompanying drawings, Figure 1 is a side view of the device, showing it in place on the table of a drill-press. Fig. 2 is an end view thereof; and Fig. 3 is a section of line 3 3, Fig. 1.

The device comprises a suitable base-plate 1, provided with standards 2, which are provided with bearings 3 for a rotatable shaft 4. This shaft projects beyond one bearing and at its outer end is provided with a crank 5, carrying a spring-pressed pin 6, adapted to enter holes or notches 7 in an indexing-plate 8, which is fixed to standard 2 or other stationary part in any suitable manner. The shaft 4 is provided on diametrically opposite sides with longitudinal ribs or fins 9, which serve to space apart the two sections 10 of the pulley-hub and hold these sections in exactly the position they will occupy in the finished pulley. The shaft is also provided with one or more teats or projections 11 for fitting into a hole or holes 12 of the hub-sections.

The hub-sections will be of the form shown in Fig. 3 and may previously have been provided with spoke-holes 12 in any suitable manner. These hub-sections will be placed on the shaft 4, as shown in Fig. 3, with the ribs or fins 9 spacing the sections apart and the teat or teats 11 projecting into spoke-holes therefor. The hub-sections are then firmly clasped onto the shaft, as by means of a U-shaped clamp 13 or by passing suitable bolts through the holes formed in the projecting ears 14 of the hub-sections. A collar 15 is adjustably secured on the shaft 4 and serves as a side gage for the hub-sections.

The hub-sections are held in exactly the same position as they will occupy in the finished pulley and may then be subjected to boring, counterboring, tapping, or other operation at suitable intervals. As shown in the drawings, the drill-press carries a tool 16, which may be a drill, as shown in Fig. 1, or an end mill, as shown in Fig. 3, for the purpose of forming flat countersunk seats around the spoke-holes 12, which end mill is provided with a teat 17 for entering the previously-formed holes 12 and serves to guide the tool into proper position. The holes or notches 7 in the index-plate 8 will be so arranged that when the pin 6 is moved from one to the other thereof the shaft 4 will be rotated to such positions that the various holes to be finished will be brought under the tool 16. As a consequence unskilled labor can be used for running the machine and with the assurance that the hub-sections will be formed so accurately that when built up in a pulley the latter will be absolutely true.

The pin 6 is adjustable in a slot 18 in the crank 5, so that it can be so located as to register with any one of several series of holes or notches 7 in the index-plate 8.

The ribs or fins 9 are necessary, because sectional pulleys must be so formed that the ears 14 thereof are not in actual contact, so as to give the securing-bolts a chance to clamp said sections tightly on the shaft.

This device may be used on a drill-press either with a counterboring tool or with an ordinary drill or with a tap or, in fact, with various characters of machines. The base-plate 1 therof is adapted to rest upon the bed-plate of any machine of the character specified, and it may be provided with a bolt 19 for securing the same on a T-slot in the bed-plate of the machine.

What I claim is—

1. A device of the character specified comprising a rotatable shaft provided with oppositely-disposed longitudinal fins or ribs, bearings in which said shaft is mounted, and means whereby said shaft may be turned to different positions.

2. A device of the character described comprising a rotatable shaft provided with a projecting teat or teats, bearings in which said shaft is mounted, means whereby said shaft may be turned, and an indexing device for said shaft.

3. A device of the character described comprising a rotatable shaft provided with oppositely-disposed longitudinal fins or ribs and with a projecting teat or teats, bearings in which said shaft is mounted, and means whereby said shaft may be turned to and held in different positions.

4. A device of the character described comprising a rotatable shaft provided with oppositely-disposed longitudinal fins or ribs, bearings in which said shaft is mounted, means whereby said shaft may be turned to and held in different positions, and a side gage adjustable longitudinally of said shaft.

5. In a device of the character described comprising a rotatable shaft provided with oppositely-disposed longitudinal fins or ribs, bearings in which said shaft is mounted, means whereby said shaft may be turned to various positions, and a collar on said shaft and adjustable longitudinally thereon.

In testimony whereof I, the said JOSEPH A. KAPLAN, have hereunto set my hand.

JOSEPH A. KAPLAN.

Witnesses:
F. W. WINTER,
ROBERT C. TOTTEN.